United States Patent
Borland

(10) Patent No.: US 6,343,217 B1
(45) Date of Patent: Jan. 29, 2002

(54) DIGITAL CORDLESS TELEPHONY WITH PCM CODING

(75) Inventor: David J. Borland, Austin, TX (US)

(73) Assignee: Legerity, Inc., Austin, TX (US)

(*) Notice: Subject to any disclaimer, the term of this patent is extended or adjusted under 35 U.S.C. 154(b) by 0 days.

(21) Appl. No.: 09/191,008

(22) Filed: Nov. 12, 1998

(51) Int. Cl.[7] .............................. H04Q 7/20
(52) U.S. Cl. ............... 455/462; 455/426; 375/243; 375/254; 379/93.08
(58) Field of Search ................. 455/462, 422, 455/425, 426, 463, 554, 555, 553, 552, 568, 569; 370/277; 375/222, 240.21, 240.22, 242–253; 379/93.09, 93.01, 93.05–93.08

(56) References Cited

U.S. PATENT DOCUMENTS

| | | | |
|---|---|---|---|
| 4,729,123 A | * 3/1988 | Wheen | 370/509 |
| 4,866,732 A | * 9/1989 | Carey et al. | 375/141 |
| 5,247,348 A | * 9/1993 | Israelsen et al. | 348/6 |
| 5,473,676 A | * 12/1995 | Frick et al. | 379/93.09 |
| 5,479,480 A | * 12/1995 | Scott | 379/59 |
| 5,794,152 A | * 8/1998 | Hikuma et al. | 455/502 |
| 5,867,292 A | * 2/1999 | Crimmins et al. | 359/142 |
| 5,930,719 A | * 7/1999 | Babitch et al. | 455/462 |
| 5,991,630 A | * 11/1999 | Charas | 455/452 |
| 6,002,919 A | * 12/1999 | Posti | 455/67.1 |
| 6,021,138 A | * 2/2000 | Lee | 370/524 |
| 6,076,063 A | * 6/2000 | Unno et al. | 704/500 |
| 6,111,870 A | * 8/2000 | Kurtz | 370/344 |

OTHER PUBLICATIONS

Sklar, "Digital Communications: Fundamentals and Applications", P T R Prentice Hall, Englewood Cliffs, New Jersey, 1988, pp. 617–643.

* cited by examiner

Primary Examiner—Dwayne Bost
Assistant Examiner—Charles Craver
(74) Attorney, Agent, or Firm—Conley, Rose & Tayon PC

(57) ABSTRACT

A digital cordless telephone system using lossless pulse code modulation (PCM) for encoding an audio signal. By using an efficiently implemented and uncompressed encoding scheme, the system substantially reduces implementation costs and improves the quality of transmission for white signals such as modem signals. A transceiver implementation includes a PCM coder, an RF transmitter, an RF receiver, and a PCM decoder. Also presented is a method for communicating an audio signal from a transmitter unit to a remote receiver unit. The method includes steps of sampling an audio signal into a PCM data stream, modulating the PCM data stream onto a carrier, transmitting the carrier, receiving the carrier, demodulating the PCM data stream from the carrier, and generating a reconstructed audio signal from the PCM data stream.

42 Claims, 4 Drawing Sheets

DIGITAL CORDLESS TELEPHONY WITH PCM CODING

BACKGROUND OF THE INVENTION

1. Field of the Invention

The invention relates to digital communication and, more particularly, to the coding of audio and data signals in cordless telephones.

2. Description of the Related Art

Cordless telephones can use two basic types of audio transmission: analog or digital. Digital cordless telephones offer multiple advantages over analog cordless phones, but are typically more expensive to implement. Digital coding of the audio allows a series of "1"s and "0"s to be sent over the radio part of the cordless telephone. This allows the audio information to be securely transmitted and received. Digital coding offers a higher quality transmission because analog noise that occurs in the communication link is not added into the audio information, providing a low-noise link. The penalty for digital audio is the cost of implementation. A significant amount of circuitry is required to implement the digitizing and compression of the audio.

Narrow band digital cordless telephones have historically implemented digital audio using one of two methods: ADPCM and CVSD. CVSD (continuously variable slope delta-modulation) is a simple method for digitally encoding a voice signal. Because of the simplistic way the voice is digitized, however, quality suffers in this method. At practical data rates, the quality of CVSD digital voice is not at the level of a wired telephone. ADPCM (adaptive differential pulse code modulation) was the solution to the voice quality problems of CVSD, but came at a greater implementation cost penalty. ADPCM yielded voice quality equal to that of a wired telephone; however, the ADPCM digitizing technique requires a relatively complex implementation, driving up the cost to the end user.

The other issue in a digital narrow band cordless telephone that must be considered is the data rate, which is inversely related to the energy per bit the radio uses for transmission. In a narrow band cordless telephone with a fixed transmission power, higher data rates result in a shorter range due to the correspondingly lower energy per bit. CVSD has typically been implemented at 48 kb/s. ADPCM has typically been implemented at 32 kb/s. These numbers show that ADPCM generally provides a longer range than CVSD along with the previously stated voice quality advantage, but again, with a penalty in implementation cost.

Although various designs of digital cordless telephones are available, those designs have in many ways not adequately met the consumer's need for quality as well as economy. A digital cordless telephone that meets those expectations of consumers, thus, would provide significant improvement and advance in the technology. The consumer cordless telephone market demands lower and lower implementation costs at a higher quality level. As this happens, new trade-offs and approaches are needed.

SUMMARY OF THE INVENTION

Described herein is a cordless telephone system and method using PCM techniques for encoding an audio signal. The audio signal may be human voice, music, a modem signal, or any other analog signal in a predetermined frequency range. The PCM coding scheme provides distinct advantages over the previously used lossy coding schemes, such as ADPCM and CVSD. By using this efficiently implemented coding scheme, the system substantially reduces implementation costs, a significant consideration in cordless telephones designed for residential use and in other settings where cost is an important factor. Using a PCM encoding scheme, such as A-law or $\mu$-law, provides a low cost digital telephone with excellent voice quality and a range that is acceptable for a low-cost digital cordless telephone. Further, since PCM does not degrade the audio signal quality, using it improves the quality of transmission for signals such as modem signals, another important factor for many end users.

This disclosure presents a communication system, such as a portable telephone, that has a handset and a base unit. The handset and base unit are coupled wirelessly, through an RF or IR link. The base unit receives an incoming telephone signal from a telephone connection and converts it to an incoming wireless PCM signal that is transmitted to the handset. The handset then converts incoming wireless PCM signal to an incoming audio signal that may be heard by a user. In the outgoing direction, the base unit receives an outgoing audio signal and in response generates an outgoing wireless PCM signal. The base unit receives the outgoing wireless PCM signal, converts it to an outgoing telephone signal, and provides the outgoing telephone signal to the telephone connection. The communication system may be configured to communicate with a telephone network through wired, fiber-optic, cellular, or wireless local loop links. Additionally, the links may carry analog or digital signals.

In one embodiment, the communication system is comprised in a wireless local loop system. The base unit communicates with a plurality of customer-specific portable units through wireless PCM links. The base unit is coupled to a central telephone office through an RF link.

A method is presented for communicating an audio signal from a transmitter unit to a remote receiver unit. The method includes steps of sampling an audio signal into a PCM data stream, modulating the PCM data stream onto a carrier, transmitting the carrier, receiving the carrier, demodulating the PCM data stream from the carrier, and generating a reconstructed audio signal from the PCM data stream. The PCM data stream may be encoded with linear, $\mu$-law, or A-law quantization levels. In one embodiment of the method, the quantization scheme is selectable by the user, allowing the user to switch between logarithmically spaced quantization levels ($\mu$-law or A-law) best suited for human voice, and evenly-space quantization levels (linear) that may provide better service for some modem signals. The carrier may be an RF carrier using amplitude-shift keying, frequency-shift keying, phase-shift keying, combinations of these, or other modulation schemes to convey the PCM data stream. Alternatively, the carrier may be an IR or visible-light signal transmitted through free space or through an optical fiber. Modulation schemes for the optical carrier include on-off keying (OOK), amplitude-shift keying, frequency-shift keying, and phase-shift keying, among others.

Further, this disclosure presents a transceiver with a PCM coder, an RF transmitter, an RF receiver, and a PCM decoder. The PCM coder receives a transmit audio signal and samples it to generate a PCM data stream. The RF transmitter modulates an RF carrier with the PCM data stream to generate an RF transmit signal. RF transmitter also transmits the RF transmit signal to a remote unit. The RF receiver receives an RF signal from a remote unit, and demodulates the RF received signal to extract a received PCM data stream. The PCM decoder receives the received PCM data stream and decodes it into a received audio signal.

The transceiver may be embodied in a cordless telephone handset, in which case also includes a microphone and a speaker that convert the audio signals to and from acoustic waves. The transceiver may also have a modem port that directly sends and receives the audio signals to and from a modem.

BRIEF DESCRIPTION OF THE DRAWINGS

Other objects and advantages of the invention will become apparent upon reading the following detailed description and upon reference to the accompanying drawings in which.

Figure 1:
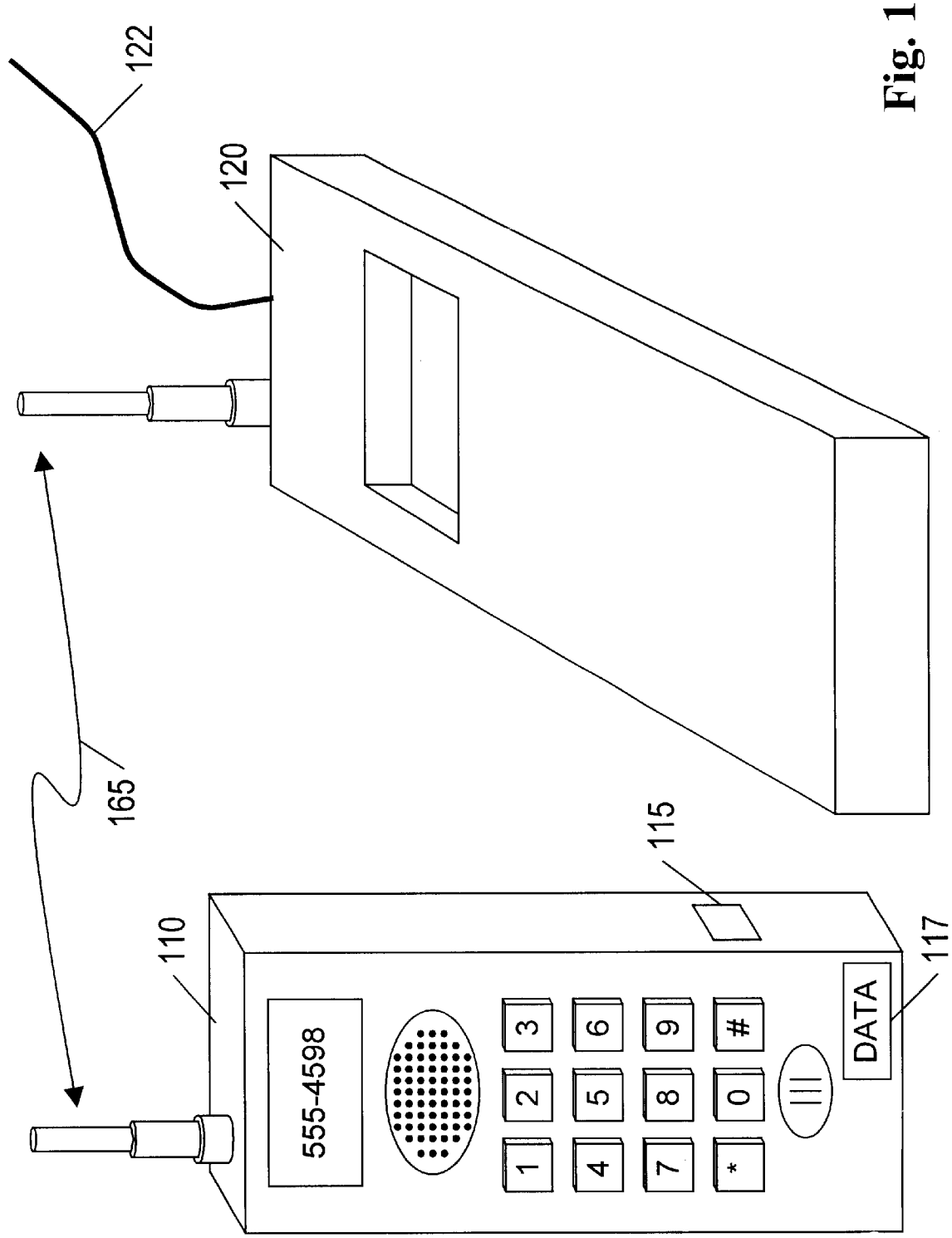
FIG. 1 is a representative view of a cordless telephone system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

A digital cordless telephone system generally includes two separate units: a handset and a base unit. These units generally communicate through a wireless link such as a radio or optical signal transmitted through free space (although the signal may alternatively be transmitted through a waveguide or an optical fiber). To transmit an audio signal or other analog signal through a digital link, the analog signal is digitized so that it can be represented by a stream of information symbols. Digitizing the audio signal involves sampling it so that values are recorded only at discrete points in time, and quantizing it, so that its amplitude is recorded as one of a discrete set of possible values. For human voice, the spectral power distribution has a bandwidth of approximately 3 kHz, so a sampling rate of 8000 samples/second (8 kS/s) records sufficiently many samples to reproduce the signal. With this sampling rate, 256 appropriately-chosen quantization levels are sufficient for producing a "toll-quality" digital audio signal.

According to the present invention, pulse code modulation (PCM) is the technique of transmitting the quantized samples as digital data through a communication channel. A 64 kbps (=8 kS/s×8 bits/sample) PCM data stream can faithfully convey a high quality digital audio signal. Slower—or more efficient—data rates may be used to carry the same audio signal. The typical spectral power distribution of human voice is highly peaked over the 200–800 Hz frequency range, with diminishing amplitudes at higher frequencies. Since the spectrum is not white over its frequency range, it can be deduced that a digitized voice signal can be compressed and decompressed without much loss of fidelity. This compression may be performed in conjunction with the digitization, using different forms of differential pulse code modulation (DPCM) such as delta modulation, "linear delta mod" (LDM), continuously variable slope delta modulation (CVSD) and various forms of adaptive differential pulse code modulation (ADPCM). Because of their reduced data rates, these coding schemes are commonly used in many communications systems for voice signals. These techniques, however, add to the complexity of a communication system by requiring additional steps in the transmission and reception of communicated signals. The increased complexity leads to a higher implementation cost for products employing these techniques. Further, when these techniques are used to reduce the required data rate, they are inherently "lossy" coding schemes, which makes them less useful for transferring "white" signals such as higher-speed modem signals.

In contrast, simple PCM voice coding without compression offers a number of advantages. PCM voice quality is excellent, typically even better than the voice quality of ADPCM. PCM coding is used in many places in the wired telephone networks, thus its quality is by definition at the toll-quality level of a wired telephone. PCM also has the advantage over ADPCM in that it can successfully pass higher-speed MODEM signals.

The quantization of the PCM coder is preferably logarithmic, in consideration of the logarithmic sensitivity of the human ear to acoustic signals. The A-law µ-law quantization schemes reflect this sensitivity and provide a lossless coding with high fidelity for human voice signals. Linear PCM coding, in contrast, is a simpler scheme that uses evenly-spaced quantization levels. Linear PCM coding may be preferable in some applications for modem signals, especially higher bit-rate modem signals.

The implementation cost of PCM is less than that of ADPCM. This consideration is important in the design of a cordless telephone for residential or other "low-end" customers. It enables a cost reduction over cordless telephones using ADPCM, and also provides better voice quality. The decreased cost and higher quality come at the penalty of a higher required data rate. As described above, PCM encoding of voice signals typically requires a data rate of 64 kb/s. The inverse relationship between data rate and range (for a fixed signal-to-noise ratio) results in a range that will be less than that of an ADPCM or CVSD system. This is the trade-off required to lower the cost of the digital telephone with high voice quality.

The decreased range, however, is an acceptable trade-off for many or most consumers. The range of current digital narrow band cordless telephones is generally much greater than a typical user in, for example, an apartment can take advantage of. A reduction in range on a lower priced telephone with excellent voice quality is thus not a hindrance to many end users. Indeed, such a system can offer a high quality digital cordless telephone to consumers who previously could not afford one.

The design of a digital cordless telephone using coding techniques such as A-law or µ-law enables a low cost digital telephone with excellent voice quality and a range that is acceptable for a low cost digital cordless telephone.

FIG. 1: Digital Communication System

A representative digital communications system 100 is shown in FIG. 1. Pictured here are a handset transceiver 110 and a base unit transceiver 120 that communicate through a wireless PCM link 165. System 100 is preferably used in a cordless telephone system, though other communication systems, such as mobile radio units and links to remote instrumentation may also embody the design considerations described herein.

Handset 110 and base unit 120 each comprise a transmitter and receiver for wireless PCM signals communicated on wireless PCM link 165. Base unit 120 receives an incoming telephone signal from telephone connection 122 and transmits information from the incoming telephone signal to handset 110 as an incoming wireless PCM signal. Handset 110 is a portable unit that re-creates an incoming audio signal (which may be a voice signal, a modem signal, or some other signal) from the incoming wireless PCM signal. In the opposite direction, handset 110 generates an outgoing wireless PCM signal in response to an outgoing audio signal. Base unit 120 receives the outgoing wireless PCM signal and converts it to an outgoing telephone signal for telephone connection 122.

In one embodiment, handset transceiver 110 and base unit transceiver 120 also communicate with other transceiver units (not shown). Handset 110 preferably includes a switch 117 that toggles between two operation modes for handset 110. In a "voice" mode, handset 110 communicates acoustic signals received through a microphone and produces by a speaker. In a "data" mode, handset 110 communicates data signals through a modem port 115.

Figure 2:
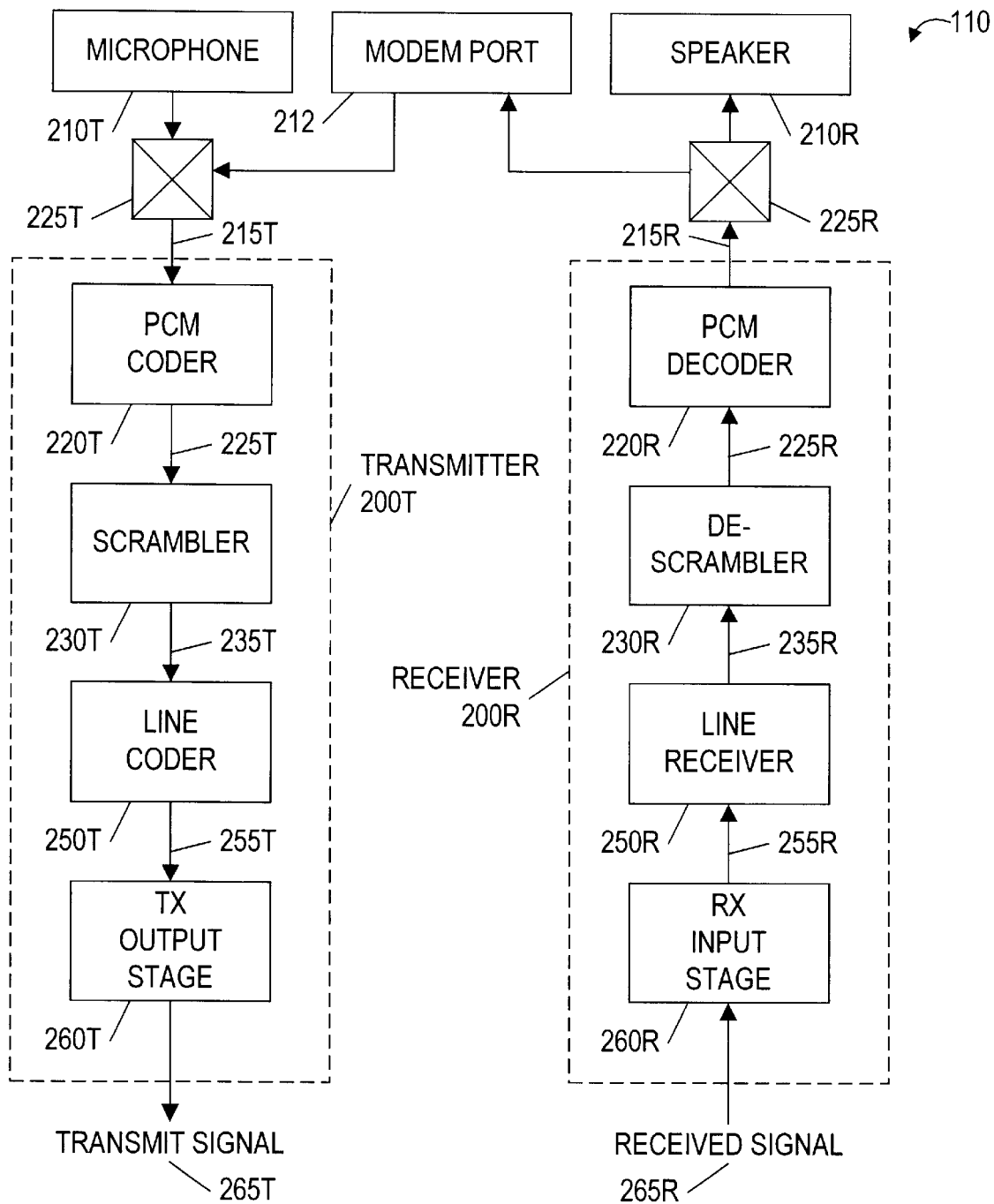
FIG. 2 is a block diagram of the transceiver from FIG. 1.

FIG. 2: Handset Transceiver—Block Diagram

FIG. 2 is a block diagram of handset transceiver 110. A transmitter 200T receives an analog transmit audio signal 215T from a microphone 210T or from modem port 115 and converts transmit audio signal 215T to an RF transmit signal 265T. A receiver 200R performs the inverse of this process: it receives an RF received signal 265R and processes received signal 265R to generate a received analog audio signal 215R. The received audio signal 215R is provided either to a speaker 210R or to modem port 115. RF transmit and receive signals 265T and 265R are communicated to base unit transceiver 120 through wireless PCM link 165 (from FIG. 1).

Transmit audio signal 215T is preferably an analog signal with frequency components in the range 30 Hz–3 kHz. Thus, transmit audio signal 215T is well-suited for carrying modem tones as well as human voice. A selector 225T coupled to microphone 210T, modem port 115, and transmitter 200T determines whether audio signal 215T is received from microphone 210T or from modem port 115. Transmit audio signal 215T also includes any dialing signals such as rotary-dial interrupts or DTMF ("touch-tone") signals from a dialing unit (not shown). Another selector 225R coupled to speaker 210R, modem port 115, and receiver 200R determines whether received audio signal 215R is provided to speaker 210T or to modem port 115. Selectors 225T and 225R comprise linked switches that connect transmitter 200T and speaker 200R either to microphone 210T and speaker 210R or to modem port 115. The switching is preferably controlled a detector (not shown) that determines when an external modem is connected to the modem port. In another embodiment, selectors 225T and 225R are switched by a user-actuated switch or pushbutton.

Transmit audio signal 215T is processed in transmitter 200T by several circuit blocks coupled in sequence: a PCM coder 220T, a scrambler 230T, a line coder 250T, and an RF transmitter 260T. The first block of the transmitter is PCM coder 220T that samples transmit audio signal 215T to generate a digital signal 225T representing the audio signal.

PCM coder 220T is a lossless coder, that is, it digitizes transmit audio signal 215T and uses a coding scheme to generate a PCM data stream 225T that completely describes the sampled signal, to within the limits of the digital sampling and quantization. In one embodiment, PCM coder 220T generates 8-bit samples of transmit audio signal 215T at an 8 kHz sample rate so that PCM data stream 225T is a 64 kbps digital signal of PCM bytes. The quantization levels used by PCM coder 220T for digitizing transmit audio signal 215T may be chosen according to a variety of protocols. For example, the levels evenly spaced in signal amplitude (linear PCM coding) or logarithmically spaced ($\mu$-law or A-law PCM coding). In one embodiment, a user may switch between quantization schemes, providing flexibility for the transceiver to better communicate human voice or certain types of modem signals.

PCM data stream 225T is preferably sent to scrambler 230T, whose principal function is to smooth or "whiten" the spectrum of transmit signal 265T, preferably by XORing the bits in PCM data stream 225T with the output of a scrambling pattern generator (not shown). Scrambler 230T preferably also buffers PCM data stream 225T so that the scrambler output 235T is grouped into transmit frames. This signal 235T is then provided to a line coder 250T that maps the scrambled digital signal into analog waveforms appropriate for the selected modulation technique, thereby producing a line-coded baseband transmit signal 255T. The baseband signal 255T is provided to an output stage 260T. This output stage 260T is an RF transmitter in which baseband transmit signal 255T is upconverted to an RF transmit frequency, amplified, and radiated as transmit signal 265T. Transmit signal 265T may use amplitude-shift keying, frequency-shift keying, phase-shift keying, or combinations of these to convey PCM data stream 225T. The implementation of line coder 250T and output stage 260T are designed in consideration of the modulation technique chosen for transmit signal 265T.

Receiver unit 200R comprises components that reverse the functions of the blocks in transmitter unit 200T. The input stage 260R is an RF receiver that receives received signal 265R and downconverts it to produce a baseband received signal 255R. A line receiver 250R samples and decodes the baseband received signal. The sampling is preferably done at a high sample rate, with the resulting digital data stream decimated to generate a received digital signal 235R with the same overall bit rate as the PCM data stream 225T. Received digital signal 235R is provided to a descrambler 230R, which XORs it with the same whitening sequence that is used in scrambler 230T, thereby recovering a received PCM data stream 225R. Descrambler 230R provides PCM data stream 225R to a PCM decoder 220R, which reconstructs received audio signal 215R from the digital audio signal 225R.

In another embodiment, the audio signal is not scrambled, and scrambler 230T and descrambler 230R are not included in the transmitter and receiver, thereby further simplifying the implementation of the system.

In another embodiment, handset transceiver 110 is an infrared (IR) or other optical transceiver that communicates with other units by IR or visible-light signals transmitted either through open space or optical fibers. In this embodiment of the transceiver, transmitter output stage 260T is an optical source, such as an LED or a diode laser, that generates an optical transmit signal 265T modulated with the baseband transmit signal 255T. The optical modulation may be performed by binary on-off keying (OOK), amplitude-shift or frequency-shift keying, or phase-shift keying of a coherent optical signal. Receiver input stage 260R is an optical detector, such as a photodiode, that receives an optical receive signal 265R and in response generates an information-modulated baseband signal 255R that is sampled and decoded in line receiver 250R.

Figure 3:
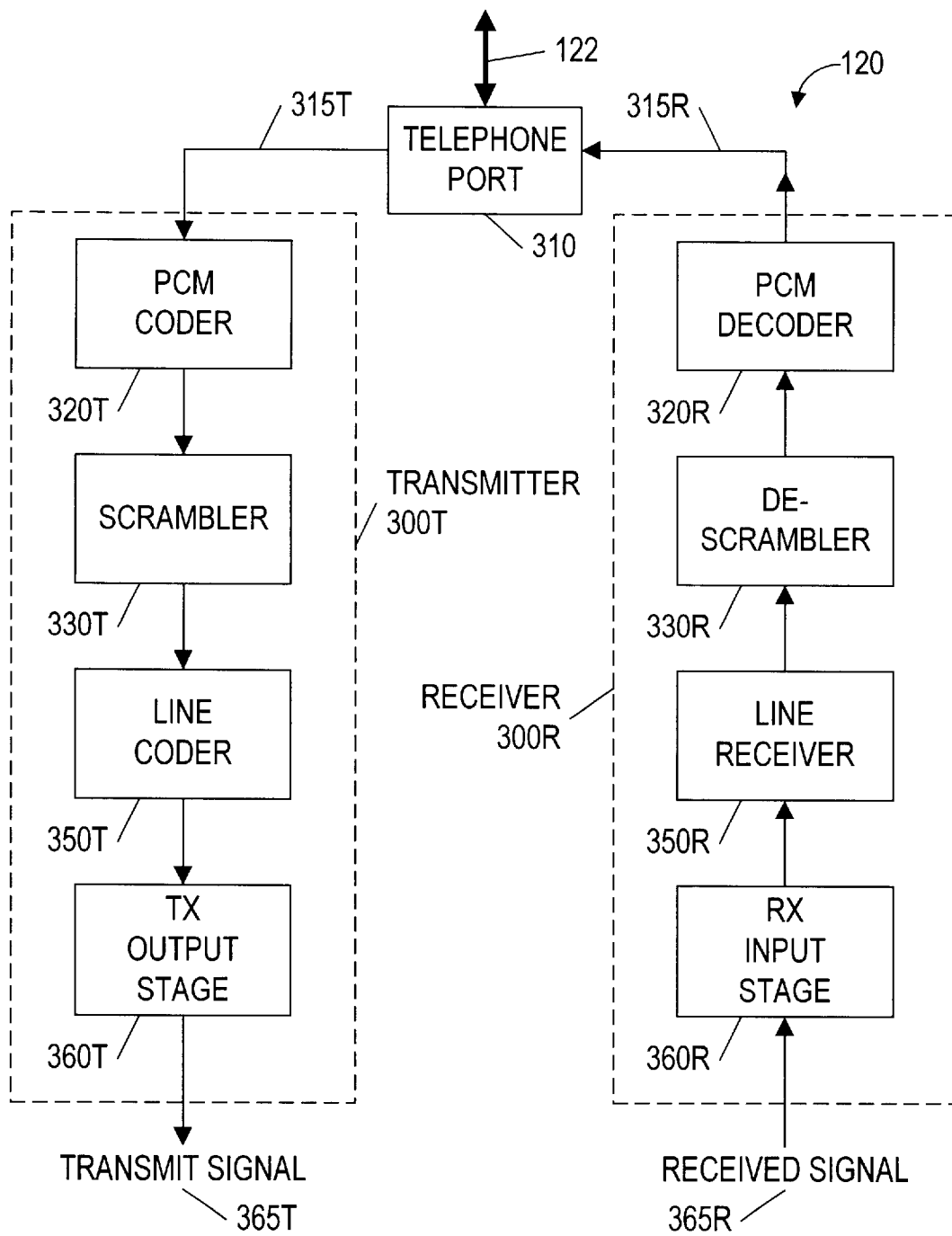
FIG. 3 is a block diagram of the base unit from FIG. 1.

FIG. 3: Base Unit—Block Diagram

FIG. 3 is a block diagram of base unit transceiver 120. Base unit transceiver 120 comprises a transmitter 300T and a receiver 300R that function in a manner similar to that of handset transceiver 110 described above, except that instead of receiving and generating acoustic signals in a microphone and speaker, base unit transceiver 120 communicates on telephone connection 122.

Transmitter 300T receives an incoming audio signal 315T from telephone connection 122 through a telephone port 310. Transmitter 300T converts incoming audio signal 315T to an RF transmit signal 365T (which is received by handset 110 as signal 265R). Receiver 300R receives an RF received signal 365R (which is generated by handset 110 as signal 265T) and processes received signal 365R to generate an outgoing audio signal 315R. Outgoing audio signal 315R is provided to telephone connection 122 through telephone port 310. RF transmit and receive signals 365T and 365R are communicated to handset 110 through wireless PCM link 165 (from FIG. 1). If telephone connection 122 is configured to carry a digital signal, telephone port 310 converts incoming and outgoing audio signals 315T and 315R from and to the appropriate digital format.

Transmitter 300T preferably comprises components (such as a PCM coder 320T, a scrambler 330T, a line coder 350T, and an RF transmitter 360T) that perform the same operations as the corresponding components of transmitter 200T in handset 110. Similarly, receiver 300R preferably includes components (such as a PCM decoder 320R, a descrambler 330R, a line receiver 350R, and a receiver input stage 360R) that function in the same manner as the corresponding components of receiver 200R in handset 110.

In one embodiment, telephone port 310 is configured to receive an analog telephone signal, such as a POTS ("plain-old telephone service") or wireless local loop signal, from telephone connection 122. In other embodiments, the telephone signal from telephone connection 122 is a digital signal or is included in a digital signal. The digital signal may be a DSL, ADSL, HDSL, HDSL2, other xDSL, ISDN, or T1 signal, among others. Telephone port 310 is configured to convert the digital signal, or an audio portion of the digital signal, to incoming audio signal 315T, and to likewise convert outgoing audio signal 315R into the appropriate digital format for telephone connection 122.

If telephone connection 122 is a digital signal, then incoming and outgoing audio signals 315T and 315R are preferably digital audio signals, converted to and from the PCM format by PCM coder 320T and PCM decoder 320R.

It is noted that in certain cases, such as when the telephone signal is an ISDN signal, the audio signal in the telephone signal is already in a PCM digital format. In such cases, the PCM audio signal may be directly used, obviating the need for the PCM coder 320T and decoder 320R. In these cases, telephone port 310 is coupled directly to scrambler 330T and to descrambler 330R (or to line coder 350T and line receiver 350R, if the scrambler is not implemented), and telephone port 310 provides and receives PCM audio signals without performing any analog-to-digital or digital-to-digital conversions.

In another embodiment, telephone connection 122 is a dedicated computer line, such as an Ethernet line. Telephone port 310 is then configured to extract a digital audio signal from data received on telephone connection 122 and to convert the digital audio signal into incoming audio signal 315T. In this embodiment, telephone port 310 may be comprised in a separate conversion unit, such as a plug-in card for a home computer.

In one embodiment, the system is incorporated in a wireless local loop (WLL) network. In this embodiment, telephone connection 122 is a WLL link to a remote transceiver in a central telephone office (CO). Base unit transceiver 120 receives the WLL link from the CO and serves as a distribution point for a local area, such as an apartment building or a block of houses. Each apartment, house, or other "customer" in the local area has a handset transceiver 110 that is linked to base unit transceiver 120 through a wireless PCM link 165 (from FIG. 1).

In yet another embodiment, telephone connection 122 is an analog or digital cellular telephone link, and telephone port 310 receives and transmits audio signals 315T and 315R on the cellular link 122. Such a system may be particularly useful in an mobile communications system, one embodiment of which is shown in FIG. 4.

Figure 4:
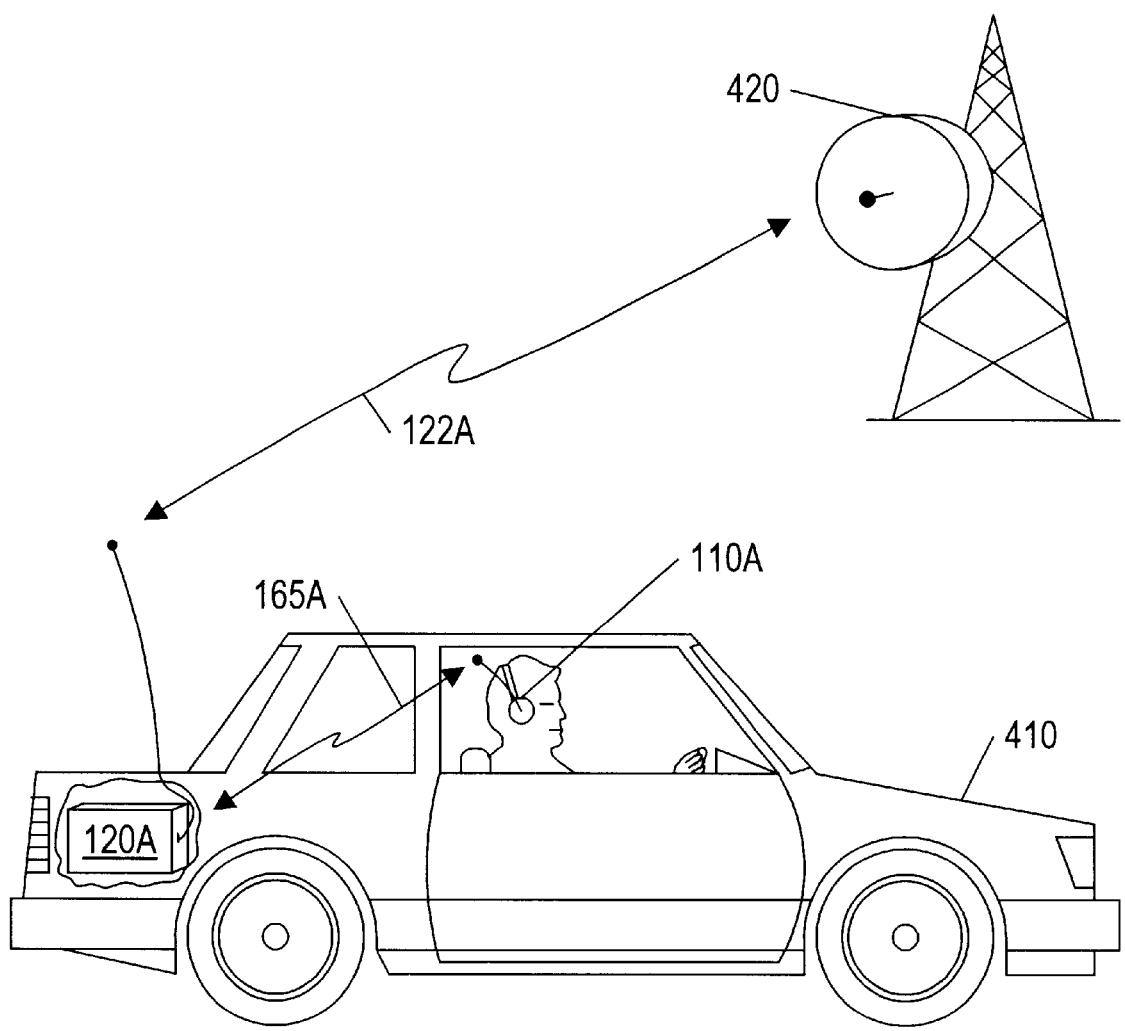
FIG. 4 is a representative view of a mobile communications system.

FIG. 4: Mobile Communications Application

FIG. 4 illustrates an embodiment of the PCM transceiver in a mobile communications system. This embodiment enables a "hands-free" telephone system in an environment where a user may prefer not to carry a cellular-telephone handset. In this embodiment, the telephone signal is a cellular-telephone link 122A received by a local base unit 120A in an automobile. A hands-free unit 110A is coupled to local base unit 120A by a wireless PCM link 165A. Hands-free unit 110A includes a microphone and a speaker to performs the acoustic/electronic transduction for a user.

Hands-free unit 110A may be a headset, as shown in the figure, or a speakerphone, or a combination speaker and portable microphone, or another unit that enables hands-free communication. Base unit 120A may be placed under the driver's seat of the automobile, or in the automobile's trunk, thereby providing a measure of security against theft (especially if base unit 120A and hands-free unit 110A are "paired" units, restricted by electronic signature to operate only with each other).

The figure illustrates the system being used by a driver in an automobile, but it may also be adapted for use in trucking, in boating/marine environments, in aviation, and in business, residential, industrial, military, and other settings where a user may prefer not to be encumbered by a cellular handset.

What is claimed is:

1. A communications system comprising:

an interface configured to allow a user to select a PCM quantization scheme, wherein the PCM quantization scheme may be a logarithmic quatization scheme or a linear quantization scheme;

a base unit; and a portable unit wirelessly coupled to said base unit;

wherein said base unit is configured to receive an incoming telephone signal from a telephone connection, and wherein said base unit is configured to generate an incoming wireless PCM signal in response to the incoming telephone signal;

wherein said portable unit is configured to receive the incoming wireless PCM signal from said base unit and to generate an incoming audio signal in response to the incoming wireless PCM signal;

wherein said portable unit is further configured to receive an outgoing audio signal and to generate an outgoing wireless PCM signal using the user-selected quantization scheme in response to the outgoing audio signal;

wherein said base unit is further configured to receive the outgoing wireless PCM signal, wherein said base unit is configured to generate an outgoing telephone signal in response to the outgoing wireless PCM signal, and wherein said base unit is configured to provide the outgoing telephone signal to the telephone connection.

2. The communications system of claim 1, wherein the incoming and outgoing audio signals comprise voice signals, and wherein the user-selected PCM quantization scheme comprises a logarithmic quantization scheme.

3. The communications system of claim 2, wherein the logarithmic PCM quantization scheme comprises one of a $\mu$-law quantization scheme, or an A-law quantization scheme.

4. The communications system of claim 1, wherein the incoming and outgoing audio signals comprise modem signals, and wherein the user-selected PCM quantization scheme comprises a linear quantization scheme.

5. The communications system of claim 1, wherein the logarithmic quantization scheme is selectable for use in voice applications and the linear quantization scheme is selectable for data communications.

6. The communications system of claim 1, wherein the incoming and outgoing telephone signals comprise one or more of POTS telephone signals, wireless local loop telephone signals, and digital telephone signals.

7. The communications system of claim 1, wherein the incoming and outgoing telephone signals comprise one or more of DSL, ADSL, HDSL, HDSL2, and T1 telephone signals.

8. The communications system of claim 1, wherein the incoming telephone signal comprises an incoming PCM signal, and wherein the incoming wireless PCM signal comprises a first RF carrier modulated with the incoming PCM signal; and wherein the outgoing wireless PCM signal comprises a second RF carrier modulated with an outgoing PCM signal, and wherein the outgoing telephone signal comprises the outgoing PCM signal demodulated from the outgoing wireless PCM signal.

9. The communications system of claim 1, wherein the incoming and outgoing telephone signals comprise digital signals communicated on a computer network.

10. The communications system of claim 1, wherein the telephone connection comprises a wireless link to a wireless local loop central office, wherein said base unit is comprised in a local-area base station, wherein said base unit communicates call for a plurality of users in a local area, and wherein said portable unit communicates telephone calls for a single user of the plurality of users.

11. The communications system of claim 1, wherein the telephone connection comprises a cellular telephone connection.

12. The communications system of claim 1, wherein the telephone connection comprises a cellular telephone connection, wherein said base unit is configured for operation in an automobile, and wherein said portable unit is either a headset unit or a speakerphone.

13. The communications system of claim 1, wherein the incoming and outgoing wireless PCM signals comprise radio signals.

14. The communications system of claim 1, wherein the incoming and outgoing wireless PCM signals comprise IR signals.

15. A method for communicating an audio signal from a transmitter unit to a receiver unit, the method comprising:

receiving input from a user indicating a selected PCM quantization scheme, where in the PCM quantization scheme may be a logarithmic quantization scheme or a linear quantization scheme;

the transmitter unit sampling the audio signal to generate a PCM data stream therefrom, wherein said sampling is performed according to the user-selected PCM quantization scheme;

the transmitter unit modulating the PCM data stream onto a carrier after said sampling;

the transmitter unit transmitting the carrier after said modulating;

the receiver unit receiving the carrier after said transmitting;

the receiver unit demodulating the PCM data stream from the carrier after said receiving; and the receiver unit generating a reconstructed audio signal from the PCM data stream after said demodulating.

16. The method of claim 15, wherein the incoming and outgoing audio signals comprise voice signals, and wherein the user-selected PCM quantization scheme comprises a logarithmic quantization scheme.

17. The method of claim 16, wherein the logarithmic PCM quantization scheme comprises one of a $\mu$-law quantization scheme or an A-law quantization scheme.

18. The method of claim 15, wherein the incoming and outgoing audio signals comprise modem signals, and wherein the user-selected PCM quantization scheme comprises a linear quantization scheme.

19. The method of claim 15, wherein the logarithmic quantization scheme is selectable for use in voice applications and the linear quantization scheme is selectable for data communications.

20. The method of claim 15, wherein the incoming and outgoing telephone signals comprise one or more of POTS telephone signals, wireless local loop telephone signals, digital telephone signals, DSL, ADSL, HDSL, HDSL2, and T1 telephone signals.

21. The method of claim 15, wherein the audio signal comprises an analog signal with frequency components substantially in the range of 30 Hz to 20 kHz.

22. The method of claim 15, wherein the audio signal comprises an analog signal with frequency components substantially in the range of 300 Hz to 3 kHz.

23. The method of claim 15, wherein the audio signal comprises a modem signal.

24. The method of claim 15, wherein the carrier comprises an RF carrier.

25. The method of claim 15, wherein the carrier comprises an IR carrier.

26. The method of claim 15, wherein the transmitter unit is comprised in a portable handset and the receiver unit is comprised in a fixed base unit.

27. The method of claim 15, wherein the transmitter unit is comprised in a fixed base unit and the receiver unit is comprised in a portable handset.

28. A communications transceiver comprising:

an interface configured to allow a user to select a PCM quantization scheme, wherein the PCM quantization scheme may be a logarithmic quantization scheme or a linear quantization scheme;

a PCM coder configured to receive a transmit audio signal and to sample the transmit audio signal using the user-selected PCM quantization scheme to generate a PCM data stream therefrom;

an RF transmitter coupled to said PCM coder and operable to receive the transmit audio signal therefrom; wherein said RF transmitter is configured to modulate an RF carrier with the PCM data stream to generate an RF transmit signal, and wherein said RF transmitter is configured to transmit the RF transmit signal;

an RF receiver operable to receive an RF received signal, wherein said RF receiver is operable to demodulate a received PCM data stream from the RF received signal; and a PCM decoder coupled to said RF receiver, wherein said PCM decoder is operable to receive the received PCM data stream and to generate a received audio signal therefrom.

29. The communications transceiver of claim 28, wherein the transmit and received audio signals comprise voice signals, and wherein the user-selected PCM quantization scheme comprises a logarithmic quantization scheme.

30. The communications transceiver of claim 29, wherein the logarithmic PCM quantization scheme comprises one of a $\mu$-law quantization scheme or an A-law quantization scheme.

31. The communications transceiver of claim 28, wherein the transmit and received audio signals comprise modem signals, and wherein the user-selected PCM quantization scheme comprises a linear quantization scheme.

32. The communications transceiver of claim 28, wherein the logarithmic quantization scheme is selectable for use in voice applications and the linear quantization scheme is selectable for data communications.

33. The communications transceiver of claim 28, wherein the audio signal comprises a modem signal.

34. The communications transceiver of claim 28, wherein said PCM coder, said RF transmitter, said RF receiver, and said PCM decoder are comprised in portable handset.

35. The communications transceiver of claim 28, further comprising:
   a microphone coupled to said PCM coder and operable to generate the transmit audio signal from an acoustic source; and
   a speaker coupled to said PCM decoder and operable to produce an acoustic output in response to the received audio signal.

36. The communications transceiver of claim 28, further comprising:
   a modem port coupled to said PCM coder and to said PCM decoder and configured to couple to a modem, wherein said modem port is operable to receive the transmit audio signal from the modem, and wherein said modem port is operable to provide the received audio signal to the modem.

37. The communications transceiver of claim 28, further comprising:
   a microphone operable to generate the transmit audio signal from an acoustic source;
   a speaker operable to produce an acoustic output in response to the received audio signal;
   a modem port configured to couple to a modem, wherein said modem port is operable to receive the transmit audio signal from the modem, and wherein said modem port is operable to provide the received audio signal to the modem; and
   a selector switch coupled to said microphone, said speaker, said modem port, said transmitter, and said receiver, wherein said selector switch is operable to couple (i) said microphone to said RF transmitter and said speaker to said RF receiver, or (ii) said modem port to said RF transmitter and said modem port to said RF receiver.

38. The communications transceiver of claim 28, wherein said PCM coder, said RF transmitter, said RF receiver, and said PCM decoder are comprised in a fixed base unit.

39. The communications transceiver of claim 28, further comprising:
   a telephone port coupled to said PCM coder and to said PCM decoder, wherein said telephone port is operable to couple to a telephone line, wherein said telephone port is operable to receive the transmit audio signal from a telephone line, and wherein said telephone port is operable to provide the received audio signal to the telephone line.

40. The communications system of claim 39, wherein the transmit audio signal and received audio signal comprise one or more of POTS telephone signals, wireless local loop telephone signals, and digital telephone signals.

41. The communications system of claim 39, wherein the transmit audio signal and received audio signal comprise one or more of DSL, ADSL, HDSL, HDSL2, and T1 telephone signals.

42. The communications system of claim 39, wherein the transmit audio signal and received audio signal comprise digital signals communicated on a computer network.

* * * * *

UNITED STATES PATENT AND TRADEMARK OFFICE
CERTIFICATE OF CORRECTION

PATENT NO. : 6,343,217 B1  Page 1 of 1
DATED : January 29, 2002
INVENTOR(S) : David J. Borland It is certified that error appears in the above-identified patent and that said Letters Patent is hereby corrected as shown below:

Column 9,
Line 41, please delete "call" and substitute -- calls --.
Line 61, please delete "where in" and substituted -- wherein --.

Signed and Sealed this

Thirtieth Day of April, 2002

Attest:

JAMES E. ROGAN
*Attesting Officer*          *Director of the United States Patent and Trademark Office*